Fig. 1

INVENTOR
ROBERT H. ELLIOTT

WILSON, SETTLE, McRAE & CRAIG
ATTORNEYS

FIG. 5

Robert H. Elliott
Wilson, Settle, M<sup>c</sup>Rae & Craig
ATTORNEYS

May 5, 1964 R. H. ELLIOTT 3,131,579
DIFFERENTIAL STRUCTURE
Filed Oct. 28, 1960 7 Sheets-Sheet 7

Fig-10

ROBERT H. ELLIOTT

WILSON, SETTLE, McRAE & CRAIG
ATTORNEYS 3,131,579
DIFFERENTIAL STRUCTURE
Robert H. Elliott, 19489 Strathmoor, Detroit 35, Mich.
Filed Oct. 28, 1960, Ser. No. 65,730
15 Claims. (Cl. 74—710.5)

The present invention relates to a differential power transmission and more particularly to a mechanical type locking differential.

In a conventional automotive differential having an engine-driven differential case driving pinion gears through a case-mounted pinion gear pin, the pinion gears meshing with wheel-connected side gears, engine torque drives the case for equal torque transfer through the pinion and side gears to the driving wheels. If one of the side gears is free to turn relative to the other side gear, then all of the engine torque will be delivered to the free side gear and no effective driving force will be exerted on the other side gear or the wheel connected thereto. For this reason, if one of the driving wheels is on ice, snow or mud without substantial frictional engagement with the road surface, the one wheel is relatively free and no effective vehicular drive can be obtained.

Previously proposed "locking differentials" have commonly utilized two way cams, friction discs or locking pawls to prevent effective differential action. Unfortunately, such proposed devices materially interfere with the normal differential function which is essential to proper steering. If turning a corner is attempted with the differenial locked, either ineffective steering will result or slippage relative to the gear-locking element will occur, with consequent wear. In the locking differentials currently available, unlocking during cornering does occur, but the mechanism then locks on the opposite cam face. Consequently, the life expectancy of all existing locking differentials now commercially available is very limited, while the noise level during angular maneuvering and turns is very high.

The present invention now provides an extremely simple, inexpensive locking mechanism for an automotive differential which utilizes the conventional and presently necessary differential components. The lost motion within the differential assembly is used to actuate the locking mechanism, which positively prevents relative movement between the wheel-connected side gears in the lockd condition, but which automatically unlocks at any time when the vehicle require differential operation, as when turning. The resultant operational advantages of insured traction at both driving wheels at all times, of easy cornering without major internal differential friction or external tire drag and of utilizing the conventional differential lubrication system will be readily appreciated.

Structurally, the present invention generally comprises a pair of locking members interposed between the side gears and movable into and out of frictional engagement therewith. The locking members are actuated by relative differential pinion pin-differential case movement, whereby the locking members are movable upon the transmission of driving torque through the differential in either direction. However, in a modified device, the locking members can be manufactured in such a manner as to provide a complete lock in one direction and a limited lock in the opposite direction. Preferably, the members are moved to their locked positions upon the transmission of torque from the engine through the differential, in a direction such as to impart forward movement to the vehicle and are moved to their unlocked positions upon the reverse transmission of torque therethrough. This occurs when the wheels are driven from the road-tire friction and is commonly referred to as "reversion torque" as distinct from "driving torque" or "engine torque".

There is no functional or structural reason why the locking members could not be reversed, so that locking would occur with the movement of the vehicle in reverse, should such operation be desired.

Most of the locking differentials heretofore developed have had substantial difficulty in performing the normal differential function when the vehicle is moving around a corner or curve. This difficulty occurs because of the tendency of the locking differentials to completely lock as the device performs its differential function under power.

It is therefore a principal object of the present invention to provide a locking differential construction which is simple, durable and of such design as to be economically manufactured and adapted for universal usage with conventional axle assemblies currently in production.

Another object of the invention is the provision of a locking differential power transmission means which will provide safety and stability during high speed driving, as well as preventing wheel spin due to wheel bounce over rough, non-uniform roads spotted with ice, snow, sand or gravel.

Another object of the invention is the provision of a mechanical locking type differential which will perform quietly and efficiently, while requiring little or no maintenance during the life of the vehicle.

Still another object of the present invention is the provision of a mechanical locking type differential where the locking device can be installed in an existing commercially manufactured axle, without major modification of the production tooling.

Still another object of this invention is the provision of a mechanical locking differential which uses standard differential lubrication, thereby eliminating the specialized lubrication service problem which currently exists.

Therefore, a good locking differential must automatically lock and unlock as the need arises, while maintaining normal and quiet differential action under power. It must prevent the transfer of shock loads to a single axle, while still providing sufficient driving torque to the wheel having traction. The locking differential must not interfere with steering and it must be of durable construction and operable regardless of the amount of wear, although inexpensive and interchangeable with existing axle assemblies and differential cases currently in production. And last, it must provide increased safety and improved stability of handling under all adverse conditions involving poor traction.

These and other objects can be obtained by the provision of a locking differential power transmission having a differential carrier adapted to be positioned in an axle housing; a rotatable drive pinion in said carrier; a differential assembly in said carrier, comprising a circular differential case; a ring gear positioned on said differential case in toothed engagement with said drive pinion; a pair of side gears in said differential case adapted for driving connection with a pair of axle shafts, a pair of pinion gears in toothed engagement with said side gears, and floating means for positioning said differential pinion gears, said differential case having a pair of slots in the periphery thereof; a locking member interposed between said side gears, said locking member spanning the differential case perpendicularly to the rotational axis thereof and having its ends slidably disposed in said slots and piloted on the inside diameter of the ring gear; said locking member having an inclined cam face extending in one direction; rotation of said differential assembly displacing said differential pinion gears for movement of said cam face, the relative movement holding said locking member into engagement with said side gears to oppose rotation thereof with respect to said differential case, said case and said side gears thus being co-rotatable to prevent effective differential action in said differential assembly.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
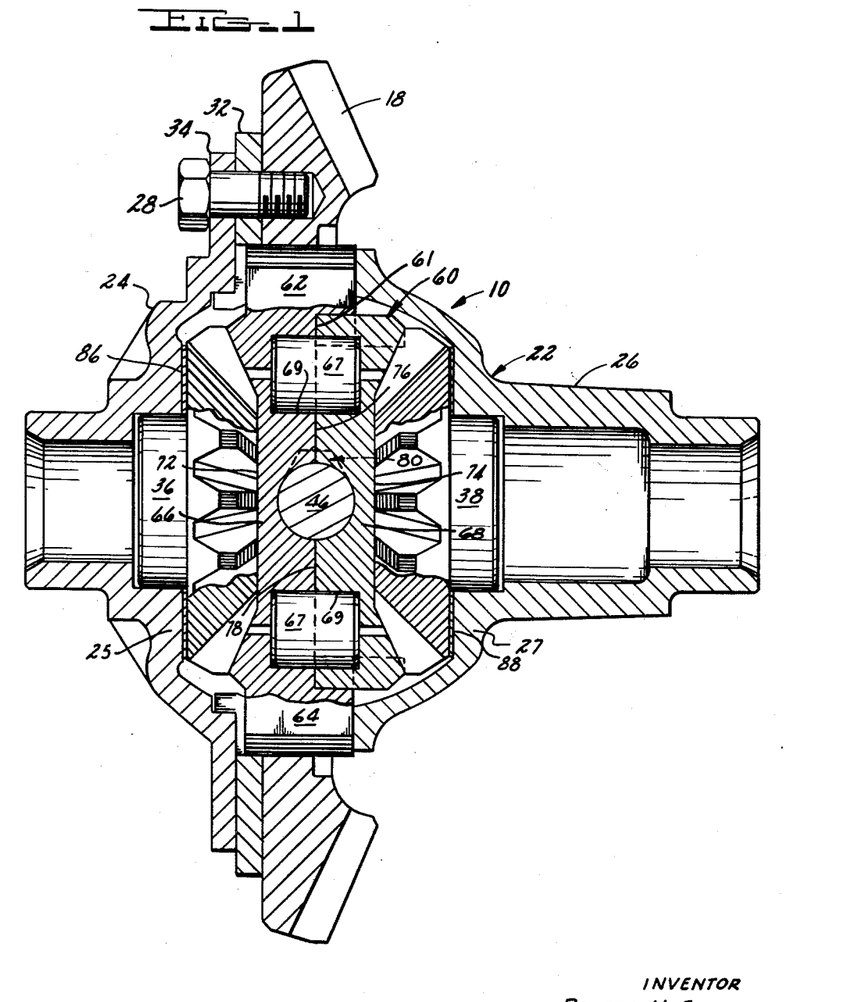
FIGURE 1 illustrates a cross sectional view taken on the center line of a differential assembly embodying the present invention.

Referring to the drawings, FIGURE 1 illustrates a differential assembly 10 embodying the present invention and which is adapted to be driven with a power source (not shown). In one form of the present invention, the differential case assembly 22 is formed of two separable sections 24 and 26. Section 24 is the cover member of the differential case, while section 26 is of generally spherical shape and forms the body portion thereof. A ring gear 18 is affixed to the differential case flange 32 and cover flange 34 with a plurality of bolts 28. When the drive pinion (not shown), is rotated, the ring gear and differential case assembly 22 carried thereby are rotated so as to drive the vehicle in which the assembly is placed.

Figure 5:
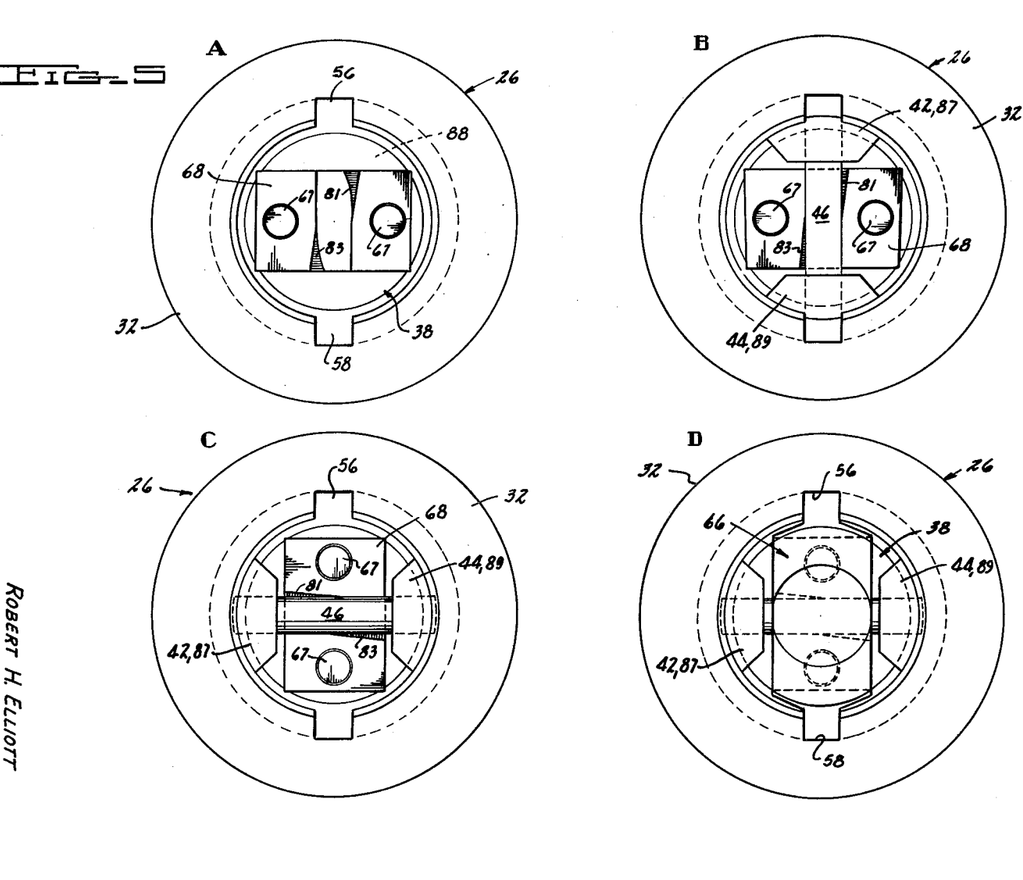
FIGURE 5 is schematic view illustrating the method of assembly of the present invention.

Within the differential case assembly 22 are two side gears 36 and 38 which are mounted on the rotational axis thereof. In mesh with each of the two side gears 36 and 38, are two differential pinion gears 42 and 44. Each of the side gears 36 and 38 is cooperable to receive and drive an axle shaft (not shown) which is coupled thereto. The differential pinion gears 42 and 44 are rotatably mounted on a floating differential pinion shaft or pin 46 that extends diametrically across the differential case assembly. The method of assembling said differential pinion gears 42 and 44 on shaft 46 in said differential case is schematically illustrated in FIGURE 5 of the drawings and will hereinafter be described.

To accommodate the locking assembly 60 of the present invention, two axially extending slots 56 and 58 are located in the periphery of the differential case section 26. Both of the axial slots 56 and 58 can be viewed in FIGURES 2 and 3 of the drawings. The floating differential pin 46 extends diametrically across the differential case section 26, perpendicularly to the rotational axis thereof and terminates within the inside of the spherical portions thereof. The outer end 62 and 64 of the locking assembly 60 are adapted to be piloted within the inside diameter of the ring gear 18. The sidewall portions of the ends 62 and 64 of the locking member are adapted to engage the sidewalls of the axial slots 56 and 58.

The locking assembly 60 is of two part construction and separable along the center line 61 thereof. The body 59 of the locking assembly is substantially rectangular in configuration. Each of the two locking sections thereof is disposed between the pinion gears 42 and 44 and intermediate the pinion pin 46 and each of the side gears 36 and 38. The outer faces 72 and 74 of the locking members 66 and 68 are of concave configuration and adapted to engage the two convex faces of each of the side gears 36 and 38. While these surfaces on the locking members are shown as being concave, it is also to be understood that they of course could be flat and accomplish the same purpose. If the faces were flat, they would merely engage the face of the side gear rather than the toothed portion thereof. Such a structure is illustrated in the modified form of the present invention shown in FIGURES 6 and 9. The inside, generally flat faces 76 and 78 of each of the locking members 66 and 68 have a pair of inclined cam surfaces 80 thereon. The above mentioned cam surfaces are cooperable with the floating pinion pin 46 in a manner to displace said locking members 66 and 68 into engagement with the side gears 36 and 38. This function will be more fully described subsequently.

Figure 2:
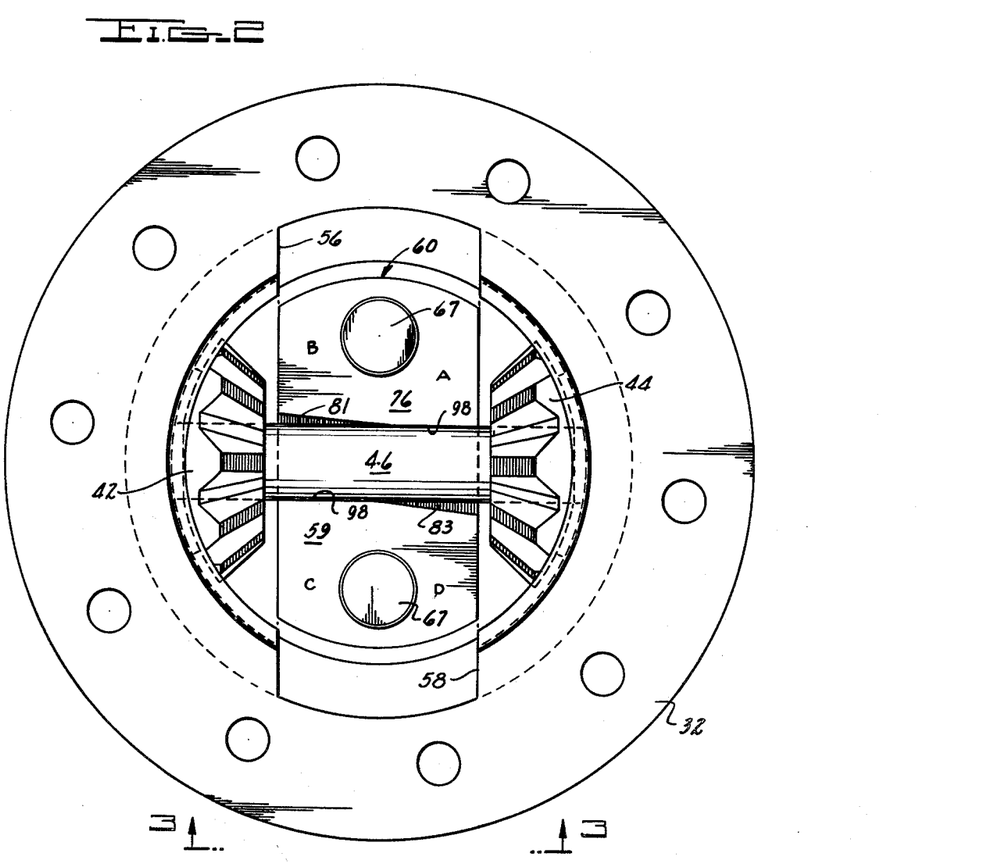
FIGURE 2 is an elevational view of the locking device shown in FIGURE 1, with the end cover plate removed.
Figure 3:
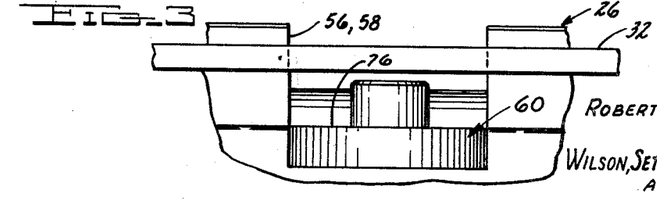
FIGURE 3 is an elevational view taken substantially in the direction of lines 3—3 on FIGURE 2.
Figure 7:
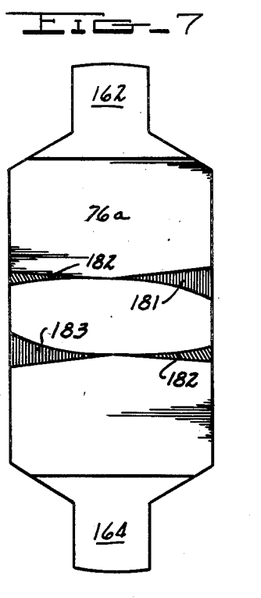
FIGURES 7 and 8 are views taken substantially along the center line of the modified locking device in the direction of the arrows shown in FIGURE 6.
Figure 8:
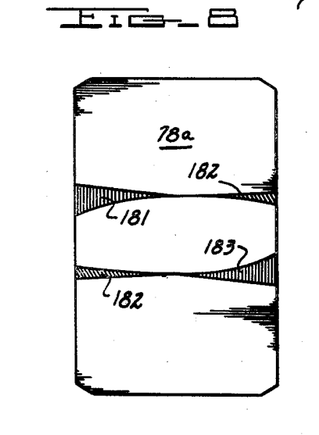

Referring to FIGURE 2 of the drawings, the relative position of the pinion gears 42 and 44 which are mounted on the floating pinion shaft 46 is illustrated. In this view, it will be noted that the differential pinion pin 46 is positioned against stops 98 in quadrants A and C of the locking member. The inclined cam surfaces 81 and 83 are positioned adjacent thereto. The cam surfaces 81 and 83 being located in quadrant B and D. By this construction, the movement of the floating pinion pin 46 is limited to one direction and consequently locking will occur as a result thereon in one direction only. However, should it be found desirable to have a partial lock in the opposite direction, a steep cam can be substituted for the stop means 98 above described. This structure is shown in FIGURES 7 and 8 of the drawings. When this structure is used, a slight noise will be encountered when powering around a corner or when differential action is otherwise required.

Figure 4:
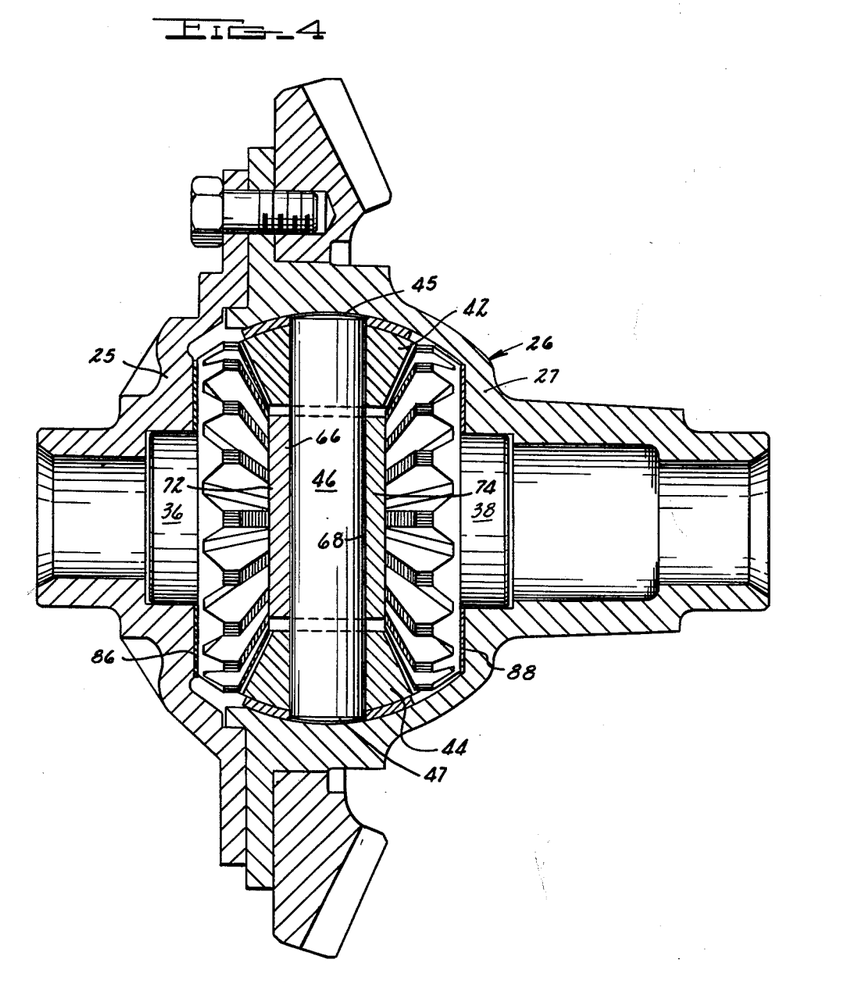
FIGURE 4 is a cross sectional view similar to FIGURE 1 and taken substantially 90° therefrom.

From FIGURE 4 of the drawings, it will be noted that the differential pinion pin 46 is entrapped within the differential case section 26 and that the ends 45 and 47 thereof are generally spherical in configuration. The ends 45 and 47 of the differential pinion pin 46 have rotatably mounted thereon, the differential pinion gears 42 and 44 (FIGURE 2) while the center section thereof is in engagement with the stops located on each of the locking members 66 and 68. To maintain both locking members in alignment, it will be noted in FIGURES 1 and 2 of the drawings, that the locking members are keyed together with pins 67 which are piloted in aligned openings 69. This simple expedient provides a means for readily aligning the locking members 66 and 68 to prevent relative rotation thereof, while providing an axial guide or key on which the locking members can be easily operated.

The side gears 36 and 38 are of standard manufacture and positioned along the rotational axis of the differential case sections 24 and 26. The side gears are held against axial displacement by the end portions 25 and 27 of the differential case sections 24 and 26. Positioned intermediate the back faces of the side gears 36 and 38 and the differential case sections 25 and 27, are two generally flat thrust washers 86 and 88. The purpose of the washer is two-fold. One reason being to receive thrust, the other to provide a means for compensating for commercial tolerances in the manufacture of the gears. A pair of dished washers 87 and 89 are provided intermediate the differential pinion gears 42 and 44 and the differential case section 26 for the same purpose.

FIGURE 5 of the drawings illustrates a schematic drawing showing the means of assembly of the present invention. In all four of the views illustrated, the differential case section 26 is shown in plan view. The thrust washer 88 is first positioned in the bottom of the differential case section 26 and the side gear 38 is placed thereupon. The locking member 68 is then positioned substantially at right angles to the slotted openings 56 and 58 in the differential case periphery. The differential pinion gears 42 and 44 and dished washers 87 and 89 are then positioned in the case adjacent the locking member 68 and the differential pinion pin inserted therethrough. The next step is rotation of the locking member 68, differential pinion pin 46, differential pinion gears 42 and 44 and dished washers 87 and 89, 90° to the slotted openings 56 and 58. The second locking member 66 is then positioned within the confines of the slots 56 and 58 and aligned with the pins 67 mounted on the face thereof. The side gear 36 with a thrust washer 86 positioned thereon is then located on the locking member 66 and the cover of the differential case 22 is then affixed in position to form a complete assembly.

Figure 6:
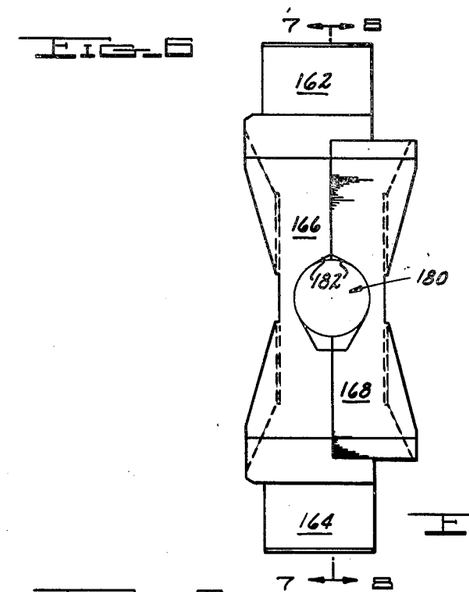
FIGURE 6 illustrates an elevational view of a modified two-part locking assembly.

FIGURES 6-8 of the drawings illustrate a modified form of the present invention wherein locking occurs in both the forward and reverse direction. This is accomplished by providing a plurality of cam surfaces 180 on each of the locking members 166 and 168. The cam surfaces illustrated provide a positive lock in the forward direction, while providing a limited lock in the reverse direction. This structure is very similar to that found in the preferred embodiment of the present invention, however, a steep cam 182 is substituted for each of the stops 98 found in a preferred form. The locking members 166 and 168 are of the same general configuration as those previously described, with the above noted revision.

Figure 9:
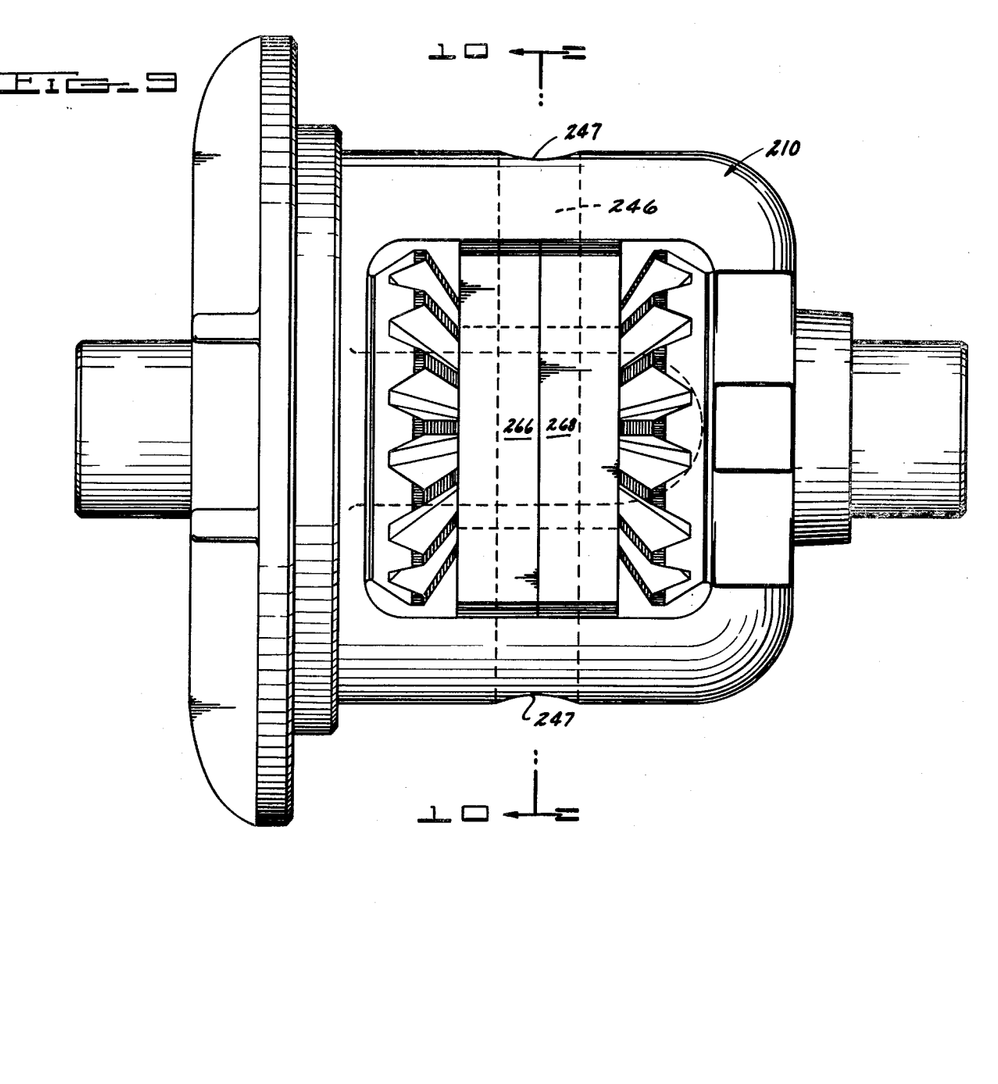
FIGURE 9 illustrates the second modified form of the present invention, wherein the locking members are positioned in a one-piece differential case housing.

FIGURE 9 illustrates a second modified form of the present invention, wherein the locking members are positioned in a one piece differential case housing 210. In this instance, the locking members 266 and 268 are generally flat and extend transversely of the differential case housing 222.

Figure 10:
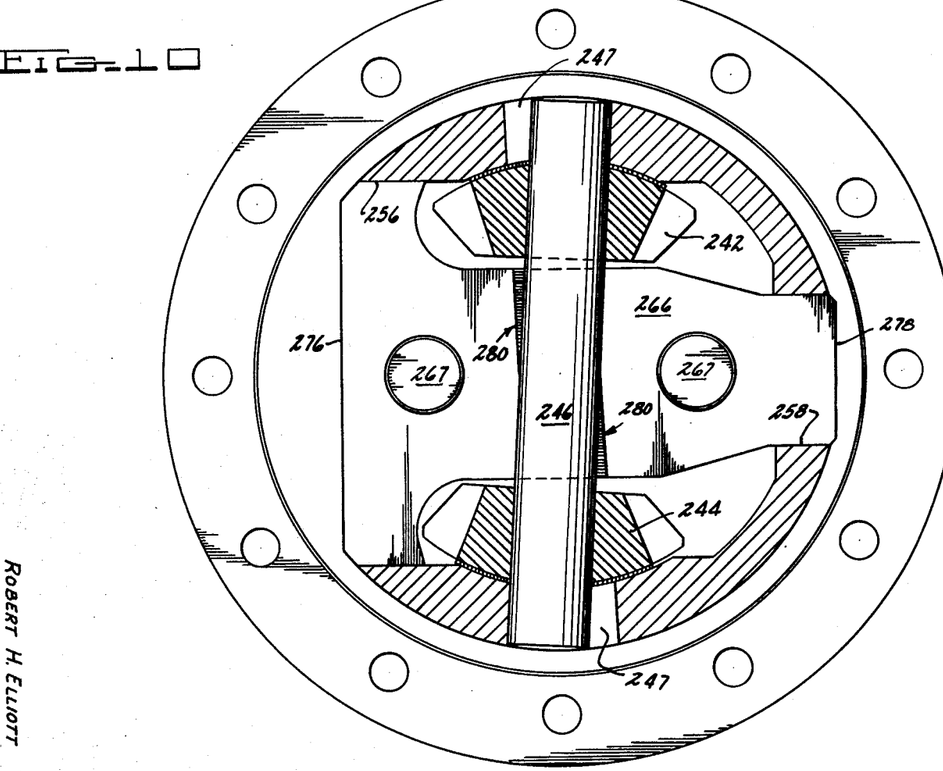
FIGURE 10 is a cross sectional view taken along lines 10—10 of FIGURE 9.

FIGURE 10 of the drawings illustrates the cross sectional views taken substantially along lines 10—10 of FIGURE 9 wherein the ends 276 and 278 of the locking members 266 and 268 are positioned in two diametrically opposite slots 256 and 258 in the differential case proper. Cam faces 280 are provided on the generally flat inner surfaces of the locking members 266 and 268, similar to those previously described in the preferred form of the present invention. However, with the use of a one piece differential case it is necessary to provide a circular opening 247 adjacent the differential pinion gears 242 and 244 so as to permit actuation of the locking members 266 and 268 through the differential pinion pin 246.

*Operation*

When starting from a standing position with both wheels on substantially the same tractive surface, the drive pinion is caused to be rotated by the engine, which in turn rotates the differential case assembly 16. As the differential case assembly 16 is rotated, the floating differential pinion pin in the preferred form of the present invention is caused to be moved against the inclined cam surfaces 81, 83, 85 and 87. As the differential pinion pin 46 moves up the inclined cam surfaces, the locking members 66 and 68 are axially displaced to the left and right respectively. The side gears 36 and 38 are then held against axial displacement by engagement of the side gears with the end portions 25 and 27 of the differential case. The locking members jam said side gears 36 and 38 with a vise-like action to prevent rotation with respect to the differential case proper. Under these conditions, the torque is effectively and equally distributed to both wheels, and as a result, one wheel cannot spin with respect to the other. When the vehicle is driven in reverse, the floating differential pinion pin moves against the stops 98 and 99 in the locking members and no locking action occurs. In the preferred form of the present invention, the positioning of cams 80 so as to operate in one direction only is intentional, and by so doing, the elimination of objectionable noises generally found in a locking differential is accomplished.

In one modified form of the present invention, this is not so since the steep cam provided permits a limited lock in the reverse direction. In this form of the invention, some noise and wear will occur when differential action is required under power.

While the present invention has been described as having the locking members 68 and 69 piloted in the ring gear 18, the locking members may of course, be piloted on a hub which is formed on the outside face thereof, adjacent the side gears, which hub is then positioned inside the axial opening in the side gears 36 and 38. It must be remembered that to have an effective and long wearing quiet locking differential structure, the cam surfaces must be positioned so as to provide a lock in one direction only.

Both modified forms of the present invention operate in the same basic manner as does the preferred form. The structure illustrated in FIGURES 9 and 19 of the drawings shows the cams 280 in one direction only, the cams may be further modified in accordance with the structure shown in FIGURES 6, 7 and 8 of the drawings so as to provide a limited lock in the reverse direction.

From the foregoing description, it will be apparent to one skilled in the art, that the above described invention is simple, durable and inexpensive. By using the preferred locking device provided with cam faces extending in one direction only, objectionable noises and unnecessary wear common to the modified forms illustrated can be eliminated. The resulting device will have a substantially increased life expectancy and will be quiet in operation.

Having thus described my invention I claim:

1. In a mechanical locking type differential for use with a power source, the combination of, a differential carrier; a drive pinion in said carrier; a differential assembly in said carrier; a generally spherical differential case having a plurality of slots in the periphery thereof, a ring gear positioned on said differential case in tooth engagement with said drive pinion; a pair of side gears in said differential case for driving connection with a pair of axle shafts; a pair of pinion gears in toothed engagement with said side gears, and a floating differential pinion pin supporting said differential pinions in said differential case; a pair of locking members between said side gears and said pinion gears; the ends of said locking members piloted in said ring gear and slidably disposed in at least two slots positioned at substantially right angles to said floating differential pinion shaft; cam means on one face of each of said locking members adjacent said floating differential pinion pin; rotation of said differential assembly with said power source displacing said floating differential pinion pin for movement relative to said cam means, thereby moving said locking members into engagement with said side gears to oppose the rotation thereof with respect to said differential case, said case and differential gears co-rotatable to prevent differential action, while permitting normal differential action when said floating differential pinion pin is displaced in the opposite direction.

2. In a differential power transmission for use with a power source, the combination of, a differential carrier positioned in an axle housing; a circular differential case rotatably positioned in said carrier; two side gears in said differential case, two differential pinion gears in toothed engagement with said side gears; said differential pinion gears being rotatably mounted in spaced relation on a floating differential pinion gear shaft which extends transversely of said differential case and terminates therewithin; lost motion means to permit circumferential movement and displacement of said differential pinion gears and shaft; a movable locking member having radially disposed cam means on one face thereof adjacent said side gears and between said differential pinion gears; said floating differential pinion gear shaft contacting said radial cam means on said movable locking member; rotational displacement of said floating pinion gear shaft and gears moving said locking member into engagement with at least one of said side gears to limit relative rotation thereof with respect to said differential case, while reverse displacement of said floating differential pinion gear shaft and gears releases said locking members.

3. In a mechanical locking differential for use with a power source, the combination of, a circular differential case; means supporting said case for rotation; a pair of spaced side gears rotatably positioned inside said differential case; a pair of spaced differential pinion gears; a floating pinion gear shaft supporting said differential pinion gears for rotation; a movable locking member between said side gears and said differential pinion gears; cam means on said locking member; said cam means on said locking member cooperable with said floating pinion gear shaft, pivotal displacement of said floating shaft in one direction displacing said movable locking member to effect co-rotation of said gears and said differential case, while displacement of said floating shaft in the opposite direction permits normal differential action by accommodating relative gear-case rotation.

4. In a conventional automotive differential assembly including a rotatable gear case, peripherally enclosing opposed side gears and opposed pinion gears, the pinion gears being mounted on a floating pin spanning the inside of the case intermediate the side gears, the improvements of a locking member lying substantially normal to the floating pin for movement toward and away from the side gears, means accommodating relative pin-case movement peripherally of the case, and cooperable cam surfaces on said floating pin and said locking member for urging the locking member into frictional surface engagement with the side gears upon relative case-pin movement.

5. In a mechanical locking differential for use with a power source, the combination of a differential carrier; a generally spherical differential case rotatably positioned in said carrier; side gears rotatably mounted in said differential case; pinion gears rotatably mounted on a movable floating shaft which extends transversely of said differential case; a pair of locking members positioned around said radially movable floating shaft between said side gears and said differential pinion gears; cam means on each of said locking members adjacent said floating pinion gear shaft; radial displacement of said floating pinion gear shaft in one direction actuating said cam means to equally displace said locking members into engagement with said gears, thereby limiting rotation of said gears with respect to said differential case, while radial rotation of said shaft in the opposite direction permits normal differential action during un-powered turns.

6. In a mechanical locking differential for use with a power source, the combination of, a differential carrier adapted to be positioned in an axle housing; a generally circular differential case rotatably positioned in said carrier; a pair of side gears in said differential case; a pair of differential pinion gears rotatably mounted in toothed engagement with said side gears in said differential case; a two piece locking member positioned between said side gears and said differential pinion gears; a floating differential pinion gear shaft; a pair of longitudinal slots disposed on the axis of rotation of said differential case; the ends of at least one of said locking members being slidably disposed in each of said longitudinal slots; radial cam means in the inner face of each of said locking members, the body of said floating differential pinion shaft in tangential contact with said cam means; the body of the pinion gear shaft when rotated being operable to spread the two piece locking member into engagement with the face of each of said side gears and thereby to limit the relative rotation thereof with respect to said differential case.

7. In a mechanical locking differential for use with a power source, the combination of, a differential carrier; a drive pinion in said differential carrier; a differential assembly in said carrier comprising, a ring gear positioned on said differential assembly in toothed engagement with said drive pinion, a differential case, a pair of side gears rotatably positioned in said differential case, a pair of pinion gears in toothed engagement with said side gears, a round floating differential pinion pin extending through said pinion gears; a first locking member positioned about the floating differential pinion pin intermediate the side gears, with a second locking member positioned in alignment with said first locking member; the ends of the first of said locking members piloted in said ring gear and slidably positioned in a pair of slots in said differential case; cam means on each of said locking members adapted to cooperate with said round floating pinion pin; rotation of said round floating pinion pin which is in tangential contact with said cam means displacing said locking members in said slots to engage the face of said side gears to rotate both side gears in unison with the differential case.

8. In a differential power transmission for use with a power source, the combination of, a differential carrier positioned in an axle housing; a differential gear assembly rotatably positioned in said carrier, said differential gear assembly including side and differential pinion gears rotatably mounted in a differential case; said pinion gears mounted on a floating pinion pin; an actuatable locking member located completely interiorly of said case intermediate the side and differential pinion gears and energizable actuating means for said locking member located within said case, said actuating means being energized in response to relative case-differential pinion gear movement.

9. In a mechanical locking differential for use with a power source, the combination of a differential carrier positioned in an axle housing; a differential case rotatably positioned in said carrier; a first pair of gears rotatably mounted in said differential case; a second pair of gears rotatably mounted on a floating shaft extending across said differential case; a pair of locking members positioned around said floating shaft between said first pair of gears and said second pair of gears; cam means on each of said locking members adjacent said floating shaft; stop means for limiting rotational movement of said floating shaft in one direction; rotational movement of said floating shaft in one direction actuating said cam means to displace said locking members into engagement with said first pair of gears to oppose rotation of said first set of gears with respect to said differential case and rotation of said floating shaft in the opposite direction against said stop means permits free differential action during un-powered turns.

10. In a mechanical locking differential for use with a power source, the combination of, a differential carrier; a circular differential case rotatably positioned in said carrier; a pair of side gears and differential pinion gears in said differential case; a floating shaft supporting said differential pinion gears for rotation, the shaft spanning the inside diameter of said differential case, a movable locking member disposed about said floating pinion gear shaft between said side gears and said differential pinion gears; the outer ends of said movable locking member being piloted in a ring gear and slidably positioned in a pair of slots in the periphery of said differential case, said slots displaced at substantially right angles to the ends of said floating pinion gear shaft; radial camming surfaces on said movable locking member engageable with said floating differential pinion gear shaft intermediate said pinion gears; displacement of said floating differential pinion gear shaft moving said locking member into engagement with said side gears to oppose the relative rotation of said side gears with respect to said differential case.

11. In a mechanical locking differential for use with a power source, the combination of, a differential carrier, a differential assembly in said carrier comprising a differential case, a pair of side gears rotatably positioned in said differential case, a pair of pinion gears in toothed engagement with said side gears, a floating differential pinion shaft extending through said differential pinion gears and terminating within the inside of said differential case; a locking member positioned intermediate the side gears; cam means on said locking member adapted to cooperate with the body of said floating pinion shaft; stop means on said locking member for limiting rotation of said floating pinion shaft in one direction; rotation of said floating pinion shaft with respect to said cam means displacing said locking member to engage said side gears, thereby rotating both side gears with the differential case.

12. In a mechanical locking type differential for use with a power source, the combination of, a differential carrier; a drive pinion in said carrier; a differential assembly in said carrier, comprising a circular differential case, a ring gear positioned on said differential case in toothed engagement with said drive pinion, a pair of side gears in said differential case adapted for driving connection with a pair of axle shafts, respectively, a pair of pinion gears in toothed engagement with said side gears, and a floating differential pinion pin extending through said differential pinion gears; said differential case having a pair of axial slots positioned in the periphery of said case and about the rotational axis thereof; a locking member interposed between said side gears and said pinion gears, said locking member spanning the differential case and having its ends slidably disposed in said axial slots within the ring gear respectively, said locking member having an inclined cam face adjacent said floating differential pinion pin; rotation of said differential assembly displacing said floating differential pinion pin for movement relative to said cam face, relative pin-face movement moving said locking member into engagement with said side gears to oppose the rotation thereof with respect to said differential case, said case and said side gears thus being co-rotatable to prevent effective differential action in said differential assembly.

13. In a locking type differential power transmission for use with a power source, the combination of, a differential carrier positioned in an axle housing; a generally circular differential case rotatably positioned in said carrier; a pair of side gears and differential pinion gears rotatably positioned in said differential case; a pair of movable locking members; each of said locking members having a substantially flat outer face adapted to engage the flat surface of each of said side gears; a radially displaceable pinion gear shaft floatable within said differential case for rotatably positioning said differential pinion gears; an inclined cam surface on the inner faces of each of said locking members and cooperable with said floatable differential pinion gear shaft; stop means adjacent said cam means for limiting radial rotation of said floatable differential pinion gear shaft and displacement of said differential pinion gears; displacement of said floatable differential pinion gear shaft in one direction displacing said locking members relative to said cam faces and into engagement with the flat faces of each of said side gears to limit the rotation thereof with respect to said differential case, while rotation of said floatable differential pinion gear shaft in the opposite direction against said stop means permits normal differential action.

14. In a differential for an automobile or the like, a driven differential case, a floating pinion shaft movable peripherally relative to the case, a pinion gear on said floating shaft, a side gear meshing with said pinion gear, the normal differential drive being from the case to the shaft to the pinions and hence to the side gears, a movable locking member located intermediate said floating pinion shaft and said side gear, means responsive to peripheral case-shaft movement for jamming said locking member between said floating pinion shaft and said side gear, thereby rendering said side gear and said pinion shaft co-rotatable, but disabling the normal case-shaft driving connection, the differential drive being locked with the case driving the side gear directly.

15. In a differential for an automobile movable in a forward direction and a reverse direction including a driven differential case, a floating pin traversing the differential case, spaced pinions on said floating pinion pin, and side gears meshing with said pinions, the improvement of a locking element piloted in a ring gear, said locking element interposed between the floating pin and one of the side gears, cam means urging the locking element into jammed engagement between the floating pinion pin and the one side gear, the cam means being inclined in one direction only, so that with the jamming engagement of the cam pin-side gear and case, co-rotation occurs and the drive through the differential is from the case to the side gear to move the automobile in a forward direction, but jamming engagement and pin-side gear co-rotation does nto occur when the case is rotatably driven to move the automobile in a reverse direction.

References Cited in the file of this patent

UNITED STATES PATENTS

| | | |
|---|---|---|
| 1,358,434 | Ford | Nov. 9, 1920 |
| 2,509,560 | Craft | May 30, 1950 |
| 2,971,404 | Thornton | Feb. 14, 1961 |

Notice of Adverse Decision in Interference

In Interference No. 95,294 involving Patent No. 3,131,579, R. H. Elliott, DIFFERENTIAL STRUCTURE, final judgment adverse to the patentee was rendered Apr. 30, 1968, as to claim 14.

[*Official Gazette October 29, 1968.*]